United States Patent [19]

Slutz et al.

[11] Patent Number: 4,931,363

[45] Date of Patent: Jun. 5, 1990

[54] BRAZED THERMALLY-STABLE POLYCRYSTALLINE DIAMOND COMPACT WORKPIECES

[75] Inventors: David E. Slutz; Paul D. Gigl, both of Worthington; Gary M. Flood, Canal Winchester; Gary W. Smith, New Albany, all of Ohio

[73] Assignee: General Electric Company, Worthington, Ohio

[21] Appl. No.: 365,268

[22] Filed: Jun. 12, 1989

Related U.S. Application Data

[62] Division of Ser. No. 158,575, Feb. 22, 1988, Pat. No. 4,899,922.

[51] Int. Cl.$^5$ ............................................... G32B 9/00
[52] U.S. Cl. ..................................... 428/408; 428/457; 428/698; 228/121
[58] Field of Search ................... 428/408, 457, 698; 228/121

[56] References Cited

U.S. PATENT DOCUMENTS

| | | | |
|---|---|---|---|
| 4,241,135 | 12/1980 | Lee et al. | 428/332 |
| 4,353,953 | 10/1982 | Moreluck | 428/213 |
| 4,380,471 | 4/1983 | Lee et al. | 419/11 |
| 4,629,373 | 12/1986 | Hall | 407/118 |
| 4,664,705 | 5/1987 | Horton et al. | 75/243 |
| 4,766,040 | 9/1988 | Hillert et al. | 428/552 |

*Primary Examiner*—Stephen J. Lechert, Jr.
*Assistant Examiner*—Nina Bhat
*Attorney, Agent, or Firm*—Mueller and Smith

[57] ABSTRACT

Disclosed is a brazed implement comprising a thermally-stable polycrystalline diamond compact, e.g. a compact of self-bonded diamond particles having a network of inter-connected empty pores dispersed throughout the compact, bonded to another of said compact or bonded to a cemented carbide support by a brazing filler metal disposed therebetween. The brazing metal comprises an alloy having a liquidus above about 700° C. and containing an effective amount of chromium. Translational shear strengths exceed about 50 kpsi even upon furnace cycling of the brazed implements and often exceed 90 kpsi. The method for fabricating the brazed implement also is disclosed.

8 Claims, No Drawings

BRAZED THERMALLY-STABLE POLYCRYSTALLINE DIAMOND COMPACT WORKPIECES

This application is a division of application Ser. No. 158,575 filed Feb. 22, 1988, now U.S. Pat. No. 4,899,922.

BACKGROUND OF THE INVENTION

The present invention relates to thermally stable polycrystalline diamond compacts and more particularly to brazing such compacts to cemented carbide supports and to themselves.

Well known in the super abrasive art are compacts of polycrystalline abrasive particles typified by polycrystalline diamond and polycrystalline cubic boron nitride (CBN) compacts. Such compacts are represented by U.S. Pat. Nos. 3,745,623 and 3,608,818 with respect to polycrystalline diamond compacts and U.S. Pat. Nos. 3,767,371 and 3,743,489 with respect to polycrystalline CBN compacts. While such polycrystalline compacts represent a significant contribution to the art in many fields of use, thermal degradation at an elevated temperature, e.g. above about 700° C., did limit their usefulness, especially in metal matrix bond applications. Thermal stability of such polycrystallline compacts was improved with the advent of thermally-stable porous self-bonded diamond and CBN compacts containing less than about 3 percent non-diamond phase, hereinafter termed "porous compacts". Compacts of this type are the subject of U.S. Pat. Nos. 4,224,380 and 4,288,248.

European Patent Publication No. 116,403 describes a thermally-stable diamond compact comprising a mass of diamond particles present in an amount of 80 to 90% by volume of the body and a second phase present in an amount of 10 to 20% by volume of the body, the mass of diamond particles contain substantially diamond-to-diamond bonding to form a coherent skeletal mass and the second phase containing nickel and silicon, the nickel being in the form of nickel and/or nickel silicide and the silicon being in the form of silicon, silicon carbide, and/or nickel silicide. British patent application No. 8508295 describes a thermally stable diamond compact comprising a mass of diamond particles present in an amount of 80 to 90% by volume of the compact and a second phase present in an amount of 10 to 20% by volume of the insert, the mass of diamond particles containing substantially diamond-to-diamond bonding to form a coherent skeletal mass and a second phase consisting essentially of silicon, the silicon being in the form of silicon and/or silicon carbide.

Diamond, synthetic or natural, is very difficult to wet, making the attachment of diamond to a variety of substrates difficult. Since porous compacts essentially are composed only of diamond, they are difficult to bond to cemented carbide supports, for example. In order to successfully bond porous compacts to cemented carbide supports, a bonding agent that is able to wet and/or adhere to both the diamond surface and the support is required. The bond between the diamond and carbide support must be sufficiently strong so as to provide a useful implement. Temperature conditions required to form the bond must be below those that cause graphitization of the diamond and/or damage to the carbide support system. The bonding agent also must be chemically and physically compatible during and after the bonding operation with both the porous diamond compact and carbide support.

The formation of a bond between porous compacts and carbide supports is inhibited by gaseous/liquid/solid films. The inhibiting films can be non-carbon material as well as adsorbed species including water vapor or oxygen. The inhibiting films, by preventing the wetting of the compact and/or carbide support by the bonding agent, reduces the strength of adhesion. Further, blocking of pores in the porous compact by impurities prevents penetration of the bonding agent into the core and reduces the ultimate bond strength.

A wide variety of bonding agents, or brazing alloys, have been proposed in the art. With respect to thermally stable diamond compacts, British Pat. No. 2,163,144 reognizes the difficulties encountered in brazing such compacts and, thus, proposes to bond a variety of thermally stable diamond compacts to carbide supports utilizing a silver or gold-based alloy containing between about 1 and 10 percent by weight of an active metal selected from the group of tungsten, titanium, zirconium, hafnium, vanadium, niobium, tantalum, chromium, and molybdenum. The alloy has a liquidus above 700° C. Data, however, only is given for diamond compacts containing a second phase of silicon, nickel, or their carbides. When the present inventors utilized brazing alloys containing carbide-forming active metals as proposed in this British patent, but when bonding porous compacts (as defined herein), bonding was erratic. Moreover, relatively low bond strengths were realized even when bonding did occur. U.S. Pat. Nos. 3,894,673 and 4,018,576 propose to bond signle crystals of diamond to metal using nickel/chromium or cobalt/chromium braze alloys.

BROAD STATEMENT OF THE INVENTION

There exists a need in the art for bonding thermally-stable diamond compacts to themselves and to carbide substrates with a bonding agent which provides good bond strength. Moreover, there exists a need in the art to be able to reliably reproduce such bonding. The present invention is addressed to such need in the art. Accordingly, the present invention is directed to a method for fabricating a brazed implement comprised of a thermally-stable compact which preferably comprises self-bonded diamond particles having a network of interconnected empty pores dispersed throughout the compact bonded to itself or to a cemented carbide support by a brazing filler metal, which method comprises brazing said thermally-stable compact to another thermally-stable compact or to a cemented carbide support using a brazing alloy having a liquidus above about 700° C. and containing an effective amount of chromium. For present purposes, polycrystalline diamond compacts are termed "thermally stable" by being able to withstand a temperature of 1200° C. in a vacuum without any significant structural degradation of the compact occurring. Such polycrystalline diamond compacts are comprised of a polycrystalline mass of diamond particles present in an amount of at least 70% by volume.

Another aspect of the present invention is a brazed implement comprising a thermally-stable compact which preferably comprises self-bonded diamond particles having a network of interconnected empty pores dispersed throughout the compact bonded to another of said compact or to a cemented carbide support by a brazing filler metal disposed therebetween which brazing metal is an alloy having a liquidus above about 700° C. and containing an effective amount of chromium.

Advantages of the present invention include the ability to effectively bond thermally-stable polycrystalline diamond compacts to themselves and to cemented carbide supports. Another advantage is the ability to reliably reproduce such bonding. Yet another advantage is the ability to fabricate porous compact/cemented carbide support composites having a transitional shear strength reproducably in excess of 50 kpsi. These and other advantages will be readily apparent to those skilled in the art based upon the disclosure contained herein.

DETAILED DESCRIPTION OF THE INVENTION

A variety of metals which are carbide formers have been used in braze alloy compositions in order to braze porous polycrystalline diamond compacts to cemented carbide supports. These carbide formers include, for example, chromium, manganese, titanium, cobalt, and tantalum. As the examples will demonstrate, only chromium has been successful in providing reproduceable bonding results. Moreover, only braze alloy compositions containing chromium have been able to provide translational shear strengths which consistently exceed 50,000 psi and which advantageously can exceed about 90,000 psi. It is believed that even higher bond strengths are possible when the system parameters and braze alloy composition have been optimized. These remarkable results for bonding thermally stable diamond compacts to carbide substrates cannot be predicted or expected based on the single crystal diamond/metal brazing reported above.

While the proportion of chromium should be effective for bonding of the porous compacts, generally the proportion of chromium will range from about 1–20 percent and advantageously will be between about 5 and 20 percent by weight of the braze alloy composition. The remaining ingredients used are conventional in the braze alloy art. These additional metals control the liquidus of the braze alloy composition which desirably should exceed 700° C., though should be less than about 1200° C. at which temperature thermal degradation of the thermally-stable compact can commence. Representative metals for inclusion in the braze alloy composition include, for example, nickel, gold, boron, palladium, silver, copper, and the like. It is even possible to utilize other carbide formers in the braze alloy composition, though other carbide formers tested to date do not provide the bonding results which have been achieved with chromium-based alloy compositions. Since neither gold nor silver is responsible for good bonding as taught in British Pat. No. 2,163,144, the high (40% or more) content of these metals is unnecessary, and their presence can be much less than 40%, for example 0–35%. An alloy composition determined to be quite effective is disclosed in U.S. Pat. No. 4,396,577 and an alloy composition thereunder is reported in the Examples.

Referring to the porous polycrystalline diamond compacts, reference again is made to U.S. Pat. Nos. 4,224,380 and 4,288,248 which provide a full disclosure thereof. The porous polycrystalline diamond compact comprises diamond particles which comprise between about 70% and 95% by volume of the compact. The metallic phase of sintering aid material is present substantially uniformly throughout the compact and is in a minor amount, typically ranging from about 0.05 to about 3% by volume of the compact. A network of interconnected empty pores are dispersed through the compact and are defined by the diamond particles and the metallic phase. Such pores generally comprise between about 5% and 30% by volume of the compact. The porous compact is comprised of self-bonded diamond particles typically ranging in size from between about 1 and 1,000 microns. The other two types of thermally-stable polycrystalline compacts reported in the art wherein silicon or silicon/nickel essentially replace the empty pore structure of porous polycrystalline diamond compacts are described in the citations referenced above.

The cemented carbide support advantageously comprised of a material selected from the group consisting of cemented tungsten carbide, titanium carbide, tungsten-molybdenum carbide, and tantalum carbide, wherein the metal bond material for the carbide is selected from the group consisting of cobalt, nickel, iron, and mixtures thereof, an elemental metal which forms a stable nitride or boride, and a metal alloy which forms a stable nitride or boride. Cobalt is the bond material of choice in the art as is use of cobalt-cemented tungsten carbide supports.

In practicing the present invention, the thermally-stable compact can be bonded to itself or to a carbide support by disposing the chromium-containing braze alloy therebetween and placing such composite in a furnace, for example, to furnace braze the thermally-stable compact. Alternatively, the components can be placed in a press, similar to that wherein conventional polycrystalline compacts are made, and heated to a temperature sufficient for achieving bonding. Preferably, however, bonding is achieved in accordance with the disclosure contained in co-pending application Ser. No. 158,336, filed on even date herewith, now U.S. Pat. No. 4,850,523. Such fabrication technique and apparatus proposes to heat sink the carbide support during the brazing operation while heating through the thermally-stable polycrystalline diamond compact. In this way, residual stresses which otherwise would result by virtue of the mismatch in coefficient of thermal expansion between the carbide and thermally-stable compact can be avoided. This technique also takes advantage of the good thermal conductivity properties of the thermally-stable polycrystalline diamond compact.

In addition or alternative to the use of a disk or foil of the chromium braze alloy, the thermally-stable compact can be coated with chromium-containing material which may be the complete braze alloy or may be a portion of the braze alloy with an additional alloy composition in the form of a disk or foil being used during the bonding process. The coating need only be on the surface of the thermally-stable compact which is to be mated with a surface of another thermally-stable compact or a surface of a cemented carbide support. Alternatively, the entire thermally-stable compact can be coated with the chromium material. Such coating need not be continuous and thick, as proposed in co-pending application Ser. No. 06/920,041, filed Oct. 16, 1986, now U.S. Pat. No. 4,738,689, which provides enhanced oxidation resistance to a porous compact, but need only be present in a sufficient amount so that the bonding proceeds as desired. It will be appreciated that multiple layers of coatings can be used as is necessary, desirable, or convenient.

Chromium coatings may be applied to the porous polycrystalline diamond compact by a variety of techniques including, for example, electrolytic plating, metal evaporation, sputtering including reactive sputtering techniques, chemical vapor deposition, pack diffusion, plasma coating, or the like. Certain advantages and limitations are inherent in each of the techniques, e.g. coating thickness and uniformity of thickness, condition of operation, etc. The presently preferred process involves chemical vapor deposition (CVD) of the chromium coating material as this process appears to provide rather uniform thickness and integrity of the resulting coatings. As noted above, an additional braze alloy, with or without chromium, can be placed between the chromium-coated thermally-stable compact and the support or other compact to which it is being bonded, or the coating may be the entire braze alloy composition necessary for achieving the requisite degree of bonding desired.

The following examples show how the present invention has been practiced, but should not be construed as limiting. In this application, all citations are expressly incorporated herein by reference.

EXAMPLES

EXAMPLE 1

Porous polycrystalline cylindrical diamond compacts (0.060 inch thick, 0.060 inch diameter) were bonded to cylindrical carbide supports (Carboloy grade 55B carbide; 84% WC, 16% C; 0.0300 inch thick, 0.529 inch diameter; General Electric Company, Detroit, Mich., Carboloy being their registered trademark) using the bonding apparatus and process set forth in copending application, Ser. No. 158,336, now U.S. Pat. No. 4,850,523, using a braze alloy having the following composition (wt-%):

| | |
|---|---|
| Ni | 58.64 ± 0.7% |
| Pd | 30.04 ± 0.1% |
| Cr | 8.26 ± 0.75 |
| B | Balance |

This braze alloy is covered in U.S. Pat. No. 4,414,178.

The recovered brazed supported compacts then were subjected to translational shear strength measurements with the following results being recorded.

TABLE 1

| Sample No. | Shear Strength (kpsi) |
|---|---|
| 1 | 55.7 |
| 2 | 81.6 |
| 3 | — |
| 4 | 83.3 |
| 5 | 50.8 |
| 6 | 50.3 |
| 7 | — |
| 8 | 53.4 |
| 9 | 58.6 |
| 10 | 51.2 |
| 11 | 48.4 |
| 12 | 84.5 |
| 13 | 48.1 |
| 14 | 56.9 |

These results demonstrate that shear strength values in excess of about 50,000 psi can be achieved with a good degree of reliability.

Next, the heating/cooling schedule was evaluated with the following results:

TABLE 2

| Sample No. | Temperature Profile Heating | Temperature Profile Cooling | Shear Strength (kpsi) |
|---|---|---|---|
| 185 | Slow | Fast | 66.4 |
| 186 | Slow | Fast | 56.8 |
| 187 | Slow | Fast | 50.0 |
| 188 | Slow | Fast | 52.1 |
| 189 | Medium | Fast | 75.8 |
| 190 | Medium | Fast | 62.5 |
| 191 | Medium | Fast | 83.8 |
| 192 | Medium | Fast | 54.3 |
| 193 | Medium | Slow | 83.3 |
| 194 | Medium | Slow | 63.4 |
| 195 | Medium | Slow | 53.4 |
| 196 | Medium | Slow | >90.0 |
| 197 | Fast | Fast | 76.0 |
| 198 | Fast | Fast | 62.5 |
| 199 | Fast | Fast | 86.8 |
| 200 | Fast | Fast | 63.8 |

The mean value of shear strength is 67.6 kpsi with a standard deviation of 13.3 kpsi. Again, excellent bond strengths are evident.

Based on the foregoing data, the medium ramp up for heating with fast cool down after the braze end point has been reached appeared to provide improved bonding. Thus, addition samples were prepared using this schedule.

TABLE 3

| Sample No. | Temperature Profile Heating | Temperature Profile Cooling | Shear Strength (kpsi) |
|---|---|---|---|
| 213 | Medium | Fast | 77.7 |
| 214 | Medium | Fast | 77.3 |
| 215 | Medium | Fast | 76.4 |
| 216 | Medium | Fast | 69.9 |

The mean value is 75.2 kpsi with a standard deviation of 3.9 kpsi. It should be noted that the same shear fixture was used for all four parts and it was worn afterwards. Lower shear values result from use of a worn fixture. Therefore, the 3.9 kpsi standard deviation probably is high. It should be noted that the displacement endpoint technique was used to determine when bonding was complete.

Finally, furnace heating to simulate furnace brazing temperature conditions was conducted by heating two samples under hydrogen to 700° C. for one hour, holding this temperature for 15 minutes, and then furnace cooling.

TABLE 4

| Sample No. | Furnace Heated | Shear Strength (kpsi) |
|---|---|---|
| 217 | Yes | 60.3 |
| 218 | Yes | 58.6 |
| 219 | No | 81.1 |
| 220 | No | >86.8 |

The mean for the non-furnace heated samples was 83.6 kpsi while the mean for the furnace heated samples was 59.5 kpsi. Even with the heat treatment supplied, shear strength values above 50 kpsi were achieved. Optimization of brazing conditions should improve performance.

EXAMPLE 2

In order to establish the uniqueness of chromium in achieved good brazing of non-porous diamond compacts to carbide supports, several commercial braze alloy compositions were evaluated.

TABLE 5

| Name | Ni | Cr | Au | B | Pd | Ag | Cu | Co | Mn | Ti | Ta | In | Fe | Braze Temp (°C.) | Shear Strength (kpsi) |
|---|---|---|---|---|---|---|---|---|---|---|---|---|---|---|---|
| Croniro | 22.0 | 6.0 | 72.0 | — | — | — | — | — | — | — | — | — | — | 975–100 | 60 |
| A-85 | 55.9 | 10.5 | — | 2.5 | 30.5 | — | — | — | .1 | — | — | — | .5 | 941–977 | 60 |
| A-84 | 14.0 | — | 35.0 | — | 10.0 | — | 31.0 | — | 10.0 | — | — | — | — | 971–1004 | 0 |
| Cocuman | — | — | — | — | — | — | 58.5 | 10.0 | 31.5 | — | — | — | — | 896–999 | 0 |
| Ticusil | — | — | — | — | — | 68.8 | 26.7 | — | — | 4.5 | — | — | — | 830–850 | 6–10 |
| Lucanex 559* | 2.0 | — | — | — | — | 56.0 | 42.0 | — | — | * | — | — | — | 926 | 10–30 |
| Lucanex 715* | .5 | — | — | — | — | 71.5 | 28.0 | — | — | * | — | — | — | 898 | 10–20 |
| 559 | 2.0 | — | — | — | — | 56.0 | 42.0 | — | — | — | — | — | — | 771–882 | 0 |
| 715 | .5 | — | — | — | — | 71.5 | 28.0 | — | — | — | — | — | — | 779 | 0 |
| 616 | — | — | — | — | — | 61.5 | 24.0 | — | — | — | 14.5 | — | — | 624–707 | 0 |
| — | — | — | — | 5.9 | — | — | — | 94.81 | — | — | — | — | — | — | 13 |
| — | — | — | — | 4.18 | — | — | — | 73.56 | — | — | 22.26 | — | — | — | 33 |

*Filler composition as reported mixed with titanium (20–50%)

These data show that the presence of manganese, cobalt, titanium, and tantalum either does not result in bonding porous compacts to carbide or results in shear strengths generally not exceeding about 35 kpsi. Use of chromium, however, results in good bonding of porous compacts to carbide and shear strengths generally exceeding 50 kpsi in early testing and exceeding 60 kpsi in later testing. Though shear strength data is not available, it should be noted that the A85 alloy has been used successfully in bonding porous diamond compacts to porous diamonds compacts.

EXAMPLE 3

As described in U.S. Pat. No. 4,850,523, (cited above), the duration of heating best is controlled by monitoring the longitudinal displacement or stroke of the compact/braze/support configuration. In this example, the displacement past maximum and past minimum was varied and the resulting shear strength of the brazed implement measured. The A-85 alloy of Example 2 was used to braze porous polycrystalline diamond compacts (0.525 inch diameter and 0.060 inch thick) to carbide supports (Carboloy grade 55B carbide, 0.529 inch diameter, 0.300 inch thick).

TABLE 6

| Sample No. | End Point[1] $d_1$ | Shear Strength[2] (kpsi) |
|---|---|---|
| 278 | 0 | 20.4 |
| 280 | 0 | 41.7 |
| 289 | 0.00005 | 13.9 |
| 276 | 0.0001 | 78.5 |
| 277 | 0.0001 | 66.8 |
| 279 | 0.0001 | 78.1 |
| 281 | 0.0002 | 73.8 |
| 283 | 0.0002 | 73.3 |
| 284 | 0.0003 | >86.8 |
| 291 | 0.0003 | 83.8 |
| 285 | 0.00035 | >86.8 |
| 282 | 0.0004 | >86.8 |
| 297 | 0.0004 | 86.4 |
| 288 | 0.0005 | >86.8 |
| 286 | 0.00055 | >86.8 |
| 292 | 0.00065 | >86.8 |
| 295 | 0.00065 | >86.8 |
| 290 | 0.00075 | >86.8 |
| 296 | 0.00080 | >86.8 |
| 293 | 0.00085 | >86.8 |
| 294 | 0.00095 | >86.8 |

[1] distance past maximum displacement
[2] 86.8 indicates limit of testing maching

TABLE 7

| Sample No. | End Point[3] $d_2$ | Shear Strength[2] (kpsi) |
|---|---|---|
| 217 | 0.0001 | 60.3 |
| 218 | 0.0001 | 58.6 |
| 219 | 0.0001 | 81.1 |
| 220 | 0.0001 | 86.8 |
| 221 | 0.0002 | 71.6 |
| 222 | 0.0002 | 76.4 |
| 223 | 0.0002 | 76.8 |
| 224 | 0.0002 | 74.2 |
| 225 | 0.0003 | 77.3 |
| 226 | 0.0003 | 84.6 |
| 227 | 0.0003 | 56.8 |
| 228 | 0.0003 | 77.7 |
| 229 | 0.0004 | 73.8 |
| 230 | 0.0004 | 13.0 |
| 231 | 0.0004 | 78.5 |
| 232 | 0.0004 | 69.4 |
| 233 | 0.0005 | 0 |
| 234 | 0.0005 | 0 |
| 235 | 0.0005 | 84.1 |
| 236 | 0.0005 | 37.7 |
| 237 | 0.0006 | 0 |
| 238 | 0.0006 | 0 |
| 239 | 0.0006 | 43.8 |

[3] distance past minimum displacement

Additionally, sample 217 and 218 were subjected to furnace heating to 700° C. over a one hour time period, held at 700° C. for 15 minutes, and then cooled to room temperature over a 45 minute time period. These samples were subjected to only 50 kpsi shear testing and evidenced no sign of bond failure.

With respect to the choice of cemented carbide grade, samples 395, 398, and 401 utilized cemented carbide grade 44A (Carboloy grade 44A cemented carbide; 94% tungsten carbide WC, 6% CO; 0.529 inch by 0.183 inch thick). Porous polycrystalline diamond compacts (0.525 inch by 0.060 inch thick) were bonded with the A-85 alloy as described above. All samples proof-tested to 50 kpsi with no evidence of bond failure.

Finally, samples Nos. 397, 400, 403, and 404 utilized type 303 stainless steel supports (0.529 inch by 0.183 inch thick) for bonding porous polycrystalline diamond compacts (0.525 inch by 0.060 inch thick) using the braze alloy composition of Example 1. Delamination of the samples occurred; however, there still was a significant amount of diamond still bonded to the stainless steel supports. This delamination can be explained as a stress problem due to the mismatch between the thermal expansions between the porous compacts and the stainless steel supports. It is believed that by improving the heat sink thermal pathway of the U.S. Pat. No. 4,850,523 apparatus, that such delamination problems can be substantially minimized, if not overcome. Still, the chromium-containing bonding alloy was effective in bonding the two materials to each other.

The foregoing data establishes the efficacy of the Cr-containing alloys in bonding thermally-stable compacts to carbide supports. The advantageous use of the U.S. Pat. No. 4,850,523 apparatus and displacement technique also are demonstrated.

We claim:

1. A brazed implement comprising a compact of self-bonded diamond particles having a network of interconnected empty pores dispersed throughout the compact bonded to another of said compact or to a cemented carbide substrate by a brazing filler metal disposed therebetween, which brazing metal is an alloy having a liquidus above about 700° C. and containing an effective amount of chromium.

2. The brazed implement of claim 1 wherein said brazing filler metal contains between about 1 and 20 percent by weight of chromium.

3. The brazed implement of claim 1 wherein said brazing filler alloy comprises by weight between 20 and 80 percent of palladium, between 2 and 13 percent of chromium, between 1 and 4 percent of boron, and the balance being nickel.

4. The brazed implement of claim 1 which comprises a compact bonded to a compact.

5. The brazed implement of claim 1 which comprises said compact brazed to said cemented carbide support.

6. The brazed implement of claim 1 wherein said carbide support is selected from the group consisting of cemented tungsten carbide, titanium carbide, tungsten-molybdenum carbide, and tantalum carbide.

7. The brazed implement of claim 6 wherein said metal bond material for said carbide is selected from the group consisting of cobalt, nickel, iron, and mixtures thereof, an elemental metal which forms a stable nitride or boride, and a metal alloy which forms a stable nitride or boride.

8. The brazed implement of claim 7 wherein said support comprises cobalt-cemented tungsten carbide.

* * * * *